Figure 1:
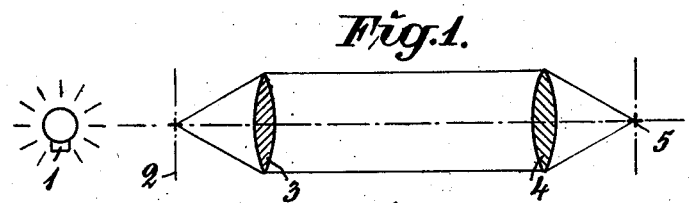

Dec. 5, 1950 T. G. AULIN 2,532,878
DEVICE FOR MEASURING THE DISTANCE BETWEEN
THE OPTICAL CENTERS OF TWO OR MORE
LENSES OR OPTICAL SYSTEMS
Filed April 5, 1945 2 Sheets-Sheet 1

Inventor:
T. G. Aulin,
By E. F. Wenderoth
Atty

Dec. 5, 1950 — T. G. AULIN — 2,532,878
DEVICE FOR MEASURING THE DISTANCE BETWEEN
THE OPTICAL CENTERS OF TWO OR MORE
LENSES OR OPTICAL SYSTEMS
Filed April 5, 1945 — 2 Sheets-Sheet 2
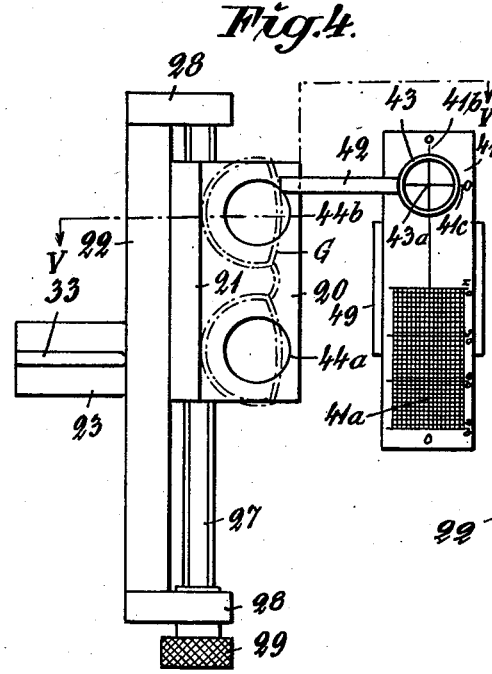
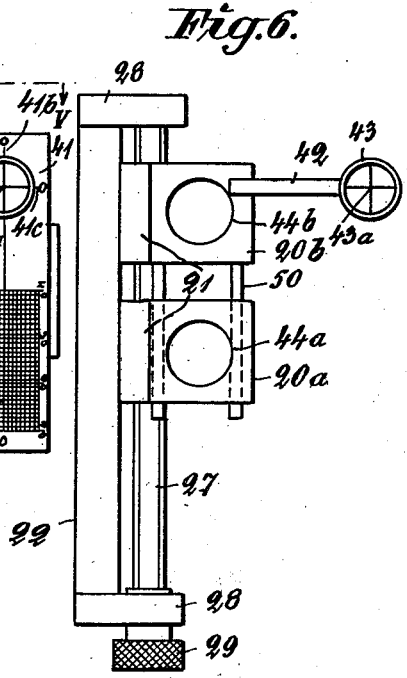
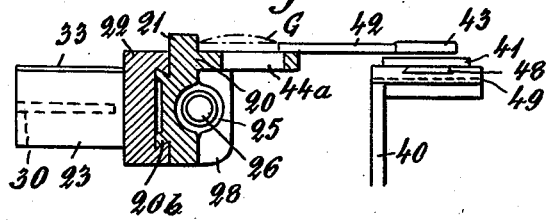

Patented Dec. 5, 1950

2,532,878

UNITED STATES PATENT OFFICE 2,532,878

DEVICE FOR MEASURING THE DISTANCE BETWEEN THE OPTICAL CENTERS OF TWO OR MORE LENSES OR OPTICAL SYSTEMS

Tage Gunnar Aulin, Trollhattan, Sweden, assignor to J. P. Brandt Aktiebolag, Stockholm, Sweden, a company of Sweden Application April 5, 1945, Serial No. 586,726
In Sweden July 8, 1944

3 Claims. (Cl. 88—56)

In writing out a prescription for spectacles, the oculist indicates not only the power of the glasses, but also the distance between the optical centers of the glasses. Moreover, in certain cases the glasses are to be at different levels. The optical center of the one glass being, for example, a millimetre or so above that of the other glass. Thus, depending on the distance between the patient's eyes and possible organic defects, the optical centers of the glasses are to be placed in a particular way in the spectacle-frame. Hitherto such mounting has been effected without the use of measuring instruments, whence the prescribed placing has been attained only in exceptional cases. If the deviation is too great, however, the eye-muscles will be strained, which may give rise to headache, etc.

One object of the present invention is to eliminate these disadvantages. A further object is to provide a measuring device in which the distance between the optical centers may be measured exactly by simple means.

A still further object of the present invention is to provide a device for measuring the distance or space between optical centers of two or more lenses or optical systems, laterally placed in a holder, for example, the distance between the centers of two spectacle-glasses mounted in a frame.

Figure 2:
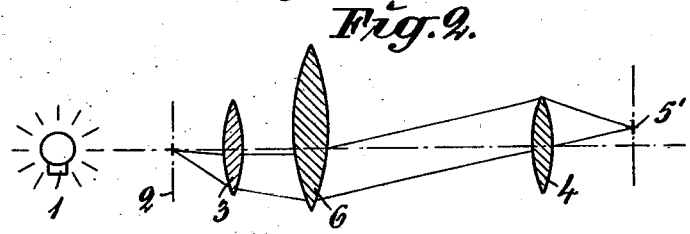
Figure 3:
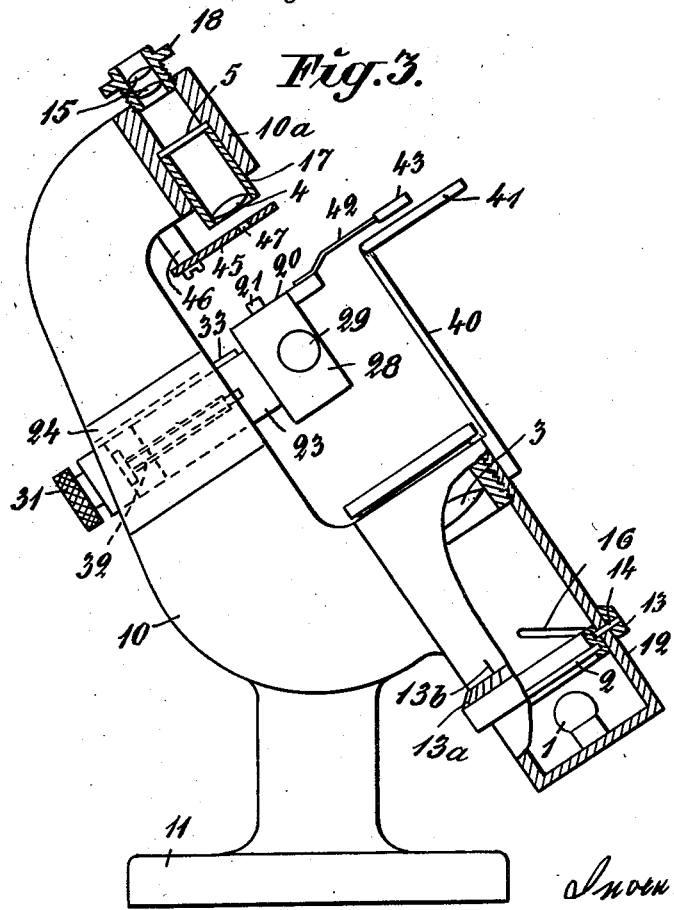

The invention is illustrated on the accompanying drawings by way of example. In the drawing:

Figures 1 and 2 diagrammatically show the path of rays in a device suitable for the execution of the invention, Figure 3 is an elevation, partly in section, of one embodiment of an apparatus according to the invention, Figure 4 is a plan view of parts of Figure 3, Figure 5 is a cross section on the line V—V in Figure 4, and Figure 6 is a plan view, similar to Figure 5, of another embodiment.

With reference to Figures 1 and 2, 1 denotes a source of light illuminating a reticle 2 in the form of a schematically indicated cross or other index. In Figure 1 this cross is placed in the focus of a positive lens 3, and the parallel pencil of rays proceeding from that lens is refracted by a lens 4 into the focus of the latter. If an additional lens 6 (Figure 2), e. g. a spectacle-glass, is introduced between the lenses 3 and 4, the lens 3 must be moved nearer the reticle 2, so that the rays, after passing the lens 6, will again be parallel. In Figure 2 the lens 6 is shown introduced in the pencil of rays in such a way that its optical center lies on one side of the axis of the projection system. As shown in this figure, the image 5' of the cross in the reticle 2 will fall in the focal plane of the lens 4 on one side of its focus.

In the focal plane of the lens 4 is arranged a ruled disc or index disc 5 of any desired appearance, e. g. likewise in the form of a cross. When the lens 6 has not been introduced into the pencil of rays, the image of the reticle cross 2 will coincide with the cross of the ruled disc 5 (Figure 1). After the introduction of the lens 6, this coincidence will occur only in case the optical center of the lens 6 lies on the axis of the projection device. It is thus clear that this method enables a procedure of exactly centering the lens 6 in the path of rays, for the centering is correct when the image of the cross 2 is observed to coincide with the cross of the disc 5 and such observation may easily be made by means of an ocular. According to the invention each of the lenses to be measured is first centered in this manner, whereupon the distance between the paths of rays is measured by a simple measuring means.

By shifting the lens 3, one can, in known manner, also find the power of the lens 6.

Figures 3-5 show a device in accordance with the invention. In Figure 3, 10 denotes a stand provided with a foot 11. At the lower end of the stand 10 is arranged a projection device comprising a casing 12 with a source of light 1, a reticle 2 and a lens 3 corresponding to the lens 3 in Figures 1 and 2. The reticle 2 can be axially displaced with the aid of a ring 13, preferably graduated in diopters, and provided with a pin 14 guided in a spiral groove 16 in the wall of the casing 12 and adapted to engage the reticle 2 and carry it in axial direction upon rotation of the ring 13. The adjusted position of this ring may be read on the scale 13a by means of an index 13b.

At the upper end 10a of the stand 10 is placed a holder 17 for a lens 4 corresponding to the lens 4 in Figures 1 and 2 and a ruled disc or index disc 5 (corresponding to the disc 5 in Figure 1) arranged so as to be viewed through an ocular 15, adjustable in known manner by means of a knob 18. Arranged in the air gap between the projection device, 1, 2, 3 and the lens 4, is a device, shown in greater detail in plan view and cross section, respectively, in Figures 4 and 5. This device consists of a supporting table or fastener 20, intended for the reception of a spectacle-frame G, and provided with a supporting edge or stop 21. By means of a part 20b the said table 20 is displaceably mounted in a guide 22, which in turn, by means of a cylindrical bolt 23, is displaceably journalled in a sleeve-like part 24 on the stand 10.

The supporting table 20 is provided with a projection 25, having a threaded aperture 26 (Figure 5), which cooperates with a screw 27, extending alongside the guide 22 and rotatably journalled in end pieces 28 of the said guide. At one end the screw carries a hand-wheel or knob 29. By turning the said wheel 29, the table 20 can be shifted along the guide 22.

In the bolt 23 there is a threaded groove 30 (Figure 5), in which engages a screw 32, rotatably, but not displaceably journalled in the stand 10 and provided with a hand-wheel or knob 31. In order to obviate rotation of the bolt 23, it is provided with a guide bar 33, engaging a groove in the boring 24 of the stand 10. Thus, by turning the wheel 31, the guide 22 and the table 20 can be shifted at right angles to the pencil of rays in the air-gap.

The table 20 has two apertures 44a, 44b which permit the rays to pass from the projection device 1, 2, 3 to the ocular 15 through the spectacle glasses G.

From the lower part of the stand 10 a holder 40 extends for a cross-ruled measuring table 41. From the supporting table 20 projects an arm 42, carrying a frame 43, provided with a hair-cross 43a. On the shifting of the table 20, this frame 43 is carried over the measuring table 41.

In using the described device for measuring the distance between optical centers of spectacle-glasses G inserted in a frame, the glasses G are placed and clamped on the table 20, so that their lower edges rest against the supporting edge 21 and so that the lenses of the glasses register with the apertures 44a, 44b. The table is then shifted, by means of the hand-wheels or knobs 29 and 31, so that one of the lenses of the eye-glasses is centered in the pencil of rays entering through one of the apertures 44a, 44b in the supporting table 20, say the aperture 44a. On the measuring table 41, preferably cross-ruled in millimetres, as shown at 41a, the coordinates for the position of the hair-cross 43a are then read, whereupon the table 20 is shifted and the other lens of the eye-glasses is centered in the pencil of rays now entering through the other aperture 44b. By reading the coordinates for the hair-cross in this new position, one can easily find the horizontal distance between the optical centers of the two lenses, as well as the vertical distance between those centers in case of any deviation in a vertical direction.

In order to facilitate measuring in the case of astigmatic lenses, a diaphragm 47 (Figure 3), which, for example, may comprise an apertured plate 45 swivelled on a bolt 46 at the stand, may be introduced between the lens intended for measurement and the holder 17 at the upper part of the stand. By the introduction of the said diaphragm, the image of the reticle 2 falling on the ruled plate 5 will be brought out in sharp relief, so that this measurement likewise can be made with great precision.

The measuring table 41 may also be displaceably mounted in a guide 48, 49 (Figure 5). With this arrangement it is possible, after the centering of the first lens, to displace the table 41 until the hair cross 43a registers with the zero point of the table 41 (i. e. the point of intersection of the lines 41b and 41c), whereupon the two distances of the lenses in a horizontal and vertical direction can be found direct, without any computation, by reading the position of the hair-cross 43a after centering of the other lens.

As indicated above, the ring 13 may be provided with a graduated scale 13a, in order to indicate the power of the glass centered in the pencil of rays, in diopters. In order that the glasses shall not irritate the wearer, the error in the distance between them after fitting into the frame must not exceed certain limits.

In order to facilitate the placing of spectacle-frames of different sizes, i. e. both for adults and for children, the supporting table 20 may be divided as shown in Figure 6, so that the distance between the openings 44a and 44b and between the outer ends of the table can be varied. According to this embodiment the table 20a, which is provided with the aperture 44a, is arranged to slide on guide bars 50 associated with a second table 20b which is provided with the apertures 44b. Both tables 20a, 20b are displaceable along the screw 27 as a unit. The relative position of the tables, adjusted according to the size of the spectacles to be measured, may be fixed in a suitable manner.

Of course, the invention is not limited to measurement of eye-glasses, but can be applied also to other optical devices, for example two camera objectives, fixed relatively to one another. Furthermore, by making the supporting table displaceable also in the direction of the axis of the projection device, the parallelism between the optical axes of the lenses can be controlled.

As astigmatic lenses consist of cylindrical or sphero-cylindrical glasses, there is no real optical center in them. In such case the position of the cylinder axes is measured with the device in accordance with the invention.

What I claim is:

1. An apparatus for measuring the distance between the optical centers of two spaced and juxtaposed optical systems mounted in a frame comprising in combination a lamp for producing a light beam, a reticle in the path of said light beam, an ocular arrangement containing a hair-cross-like index, a stand in which said lamp, reticle and ocular arrangement are mounted, supporting means for holding the optical systems to be examined, said supporting means being arranged between the reticle and said ocular arrangement and being apertured to enable said light beam to project through each of said optical systems in turn, means for displacing said supporting means in two directions at right angles to each other and to said light beam for the purpose of introducing and centering first one of said optical systems and after displacing said supporting means in one or both of said directions the other of said optical systems in said light beam, measuring means for measuring the displacement of said supporting means in each of said directions, focussing means for focussing an image of said reticle in the plane of said hair-cross said focussing means consisting of a lens arranged between said reticle and said supporting means in the path of said light beam, means for displacing said reticle along the optical axis of said lens and means for measuring the axial displacement of said reticle for the purpose of determining the focus and power in dioptrics of each of said optical systems.

2. An apparatus for measuring the distance between the optical centers of two spaced and juxtaposed optical systems mounted in a frame comprising in combination a lamp for producing a light beam, a reticle in the path of said light beam, an ocular arrangement containing a hair-cross-like index, a stand in which said lamp, reticle and ocular arrangement are mounted, supporting means for holding the optical systems to be examined, said supporting means being arranged between the reticle and said ocular arrangement and being apertured to enable said light beam to project through each of said optical systems in turn, means for displacing said supporting means in two directions at right angles to each other and to said light beam for the purpose of introducing and centering first one of said optical systems and after displacing said supporting means in one or both of said directions the other of said optical systems in said light beam, measuring means for measuring the displacement of said supporting means in each of said directions, focussing means for focussing an image of said reticle in the plane of said hair-cross, said focussing means consisting of a lens arranged between said reticle and said supporting means in the path of said light beam, means for displacing said reticle along the optical axis of said lens and means for measuring the axial displacement of said reticle for the purpose of determining the focus and power in dioptrics of each of said optical systems, said measuring means comprising a sleeve in which said reticle is arranged to be moved, a rotatable ring outside said sleeve, said ring having a pin thereon connected to said reticle, a spiral groove in the wall of said sleeve, said pin being movable in said groove, a scale graduated in dioptrics arranged on said ring and an index on said sleeve in register with said scale, said scale having an additional graduation indicating the maximal permissible error in the lateral displacement of the optical axes of said optical systems for different values of their optical strength.

3. An apparatus for measuring the distance between the optical centers of two spaced and juxtaposed optical systems mounted in a frame comprising in combination a lamp for producing a light beam, a reticle in the path of said light beam, an ocular arrangement containing a hair-cross-like index, a stand in which said lamp, reticle and ocular arrangement are mounted, supporting means for holding the optical systems to be examined, said supporting means being arranged between the reticle and said ocular arrangement and being apertured to enable said light beam to project through each of said optical systems in turn, means for displacing said supporting means in two directions at right angles to each other and to said light beam for the purpose of introducing and centering first one of said optical systems and after displacing said supporting means in one or both of said directions the other of said optical systems in said light beam, measuring means for measuring the displacement of said supporting means in each of said directions, focussing means for focussing an image of said reticle in the plane of said hair-cross said focussing means consisting of a lens arranged between said reticle and said supporting means in the path of said light beam, means for relatively displacing said reticle and said lens along the optical axis of said lens, and means for measuring said relative axial displacement for the purpose of determining the focus and power in dioptrics of each of said optical systems.

TAGE GUNNAR AULIN.

REFERENCES CITED

The following references are of record in the file of this patent:

UNITED STATES PATENTS

| Number | Name | Date |
| --- | --- | --- |
| 571,781 | Mayhew | Nov. 24, 1896 |
| 703,047 | Dirkmann | June 24, 1902 |
| 1,047,000 | De Zeng | Dec. 10, 1912 |
| 1,242,754 | Allen | Oct. 9, 1917 |
| 1,383,678 | Tillyer et al. | July 5, 1921 |
| 1,424,941 | Pirwirtz | Aug. 8, 1922 |
| 1,891,052 | Ott | Dec. 13, 1932 |
| 1,959,537 | Kuhne | May 22, 1934 |
| 1,974,606 | Fassin | Sept. 25, 1934 |
| 1,981,713 | Swenson | Nov. 20, 1934 |
| 2,081,969 | Allen et al. | June 1, 1937 |
| 2,387,440 | Guellich et al. | Oct. 23, 1945 |

FOREIGN PATENTS

| Number | Country | Date |
| --- | --- | --- |
| 231,413 | Germany | Feb. 21, 1911 |